United States Patent
Breedvelt-Schouten et al.

(10) Patent No.: US 9,564,046 B2
(45) Date of Patent: Feb. 7, 2017

(54) WEARABLE INPUT DEVICE

(71) Applicant: INTERNATIONAL BUSINESS MACHINES CORPORATION, Armonk, NY (US)

(72) Inventors: Ilse M. Breedvelt-Schouten, Ottawa (CA); Jana H. Jenkins, Raleigh, NC (US); Jeffrey A. Kusnitz, Campbell, CA (US); James L. Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 14/329,491

(22) Filed: Jul. 11, 2014

(65) Prior Publication Data

US 2016/0012716 A1   Jan. 14, 2016

(51) Int. Cl.
  *G08C 17/02*   (2006.01)
  *G06F 3/01*    (2006.01)
  *G06F 1/16*    (2006.01)

(52) U.S. Cl.
  CPC .............. *G08C 17/02* (2013.01); *G06F 1/163* (2013.01); *G06F 3/011* (2013.01); *G06F 3/017* (2013.01)

(58) Field of Classification Search
  CPC .......... G06F 3/017; G06F 1/163; G06F 3/011; G06F 3/014; G06F 3/038; G06F 3/041; G06F 3/0414; G08C 17/02
  USPC ....................................... 340/12.22; 341/176
  See application file for complete search history.

(56) References Cited

U.S. PATENT DOCUMENTS

| | | | | |
|---|---|---|---|---|
| 4,270,216 A | * | 5/1981 | Suzuki | H03G 1/00 330/2 |
| 5,369,911 A | * | 12/1994 | Fortunato | E05F 5/025 49/25 |
| 5,828,370 A | * | 10/1998 | Moeller | H04N 5/4401 348/E5.102 |
| 7,030,860 B1 | | 4/2006 | Hsu | |
| 8,199,107 B2 | | 6/2012 | Xu | |
| 8,274,534 B2 | | 9/2012 | Montague | |
| 8,390,481 B2 | | 3/2013 | Pance et al. | |

(Continued)

FOREIGN PATENT DOCUMENTS

WO   2009144363 A1   12/2009

OTHER PUBLICATIONS

R. Metz, "A Password You Wear on Your Wrist", MIT Technology Review, technologyreview.com, Feb. 27, 2013, pp. 1-2.

(Continued)

*Primary Examiner* — Jennifer Mehmood
*Assistant Examiner* — Yong Hang Jiang
(74) *Attorney, Agent, or Firm* — Law Office of Jim Boice

(57) ABSTRACT

A method and/or computer program product receives inputs from a wearable input device. A communication session is established between a wearable input device and a receiving hardware device. The receiving hardware device receives an input from the wearable input device that is generated in response to a conformational change to a shape of the wearable input device, wherein the conformational change is applied to a random section of the wearable input device. The receiving hardware device thereafter initiates a responsive action that is associated with the input from the wearable input device, wherein the responsive action occurs within the receiving hardware device.

3 Claims, 4 Drawing Sheets

(56) References Cited

U.S. PATENT DOCUMENTS

| | | | |
|---|---|---|---|
| 2001/0020276 A1* | 9/2001 | Kim | G06F 3/0231 726/25 |
| 2003/0006975 A1 | 1/2003 | Moriya | |
| 2003/0156740 A1 | 8/2003 | Siegel | |
| 2003/0214481 A1 | 11/2003 | Xiong | |
| 2004/0113956 A1* | 6/2004 | Bellwood | G06F 3/04895 715/863 |
| 2008/0136754 A1* | 6/2008 | Tsuzaki | G06F 3/04883 345/84 |
| 2009/0249061 A1* | 10/2009 | Hamilton, II | H04L 63/0823 713/156 |
| 2009/0293631 A1* | 12/2009 | Radivojevic | G01L 1/16 73/774 |
| 2010/0225595 A1 | 9/2010 | Hodges et al. | |
| 2011/0018794 A1 | 1/2011 | Linsky et al. | |
| 2011/0199292 A1 | 8/2011 | Killbride | |
| 2011/0205156 A1* | 8/2011 | Gomez | G06F 3/0346 345/157 |
| 2012/0086868 A1* | 4/2012 | Takaya | H04N 5/4403 348/734 |
| 2012/0303839 A1 | 11/2012 | Jackson et al. | |
| 2013/0044215 A1 | 2/2013 | Rothkopf et al. | |
| 2013/0314339 A1 | 11/2013 | Ueki | |
| 2014/0028921 A1* | 1/2014 | Moon | H04N 21/4126 348/734 |
| 2014/0139422 A1 | 5/2014 | Mistry | |
| 2014/0139454 A1 | 5/2014 | Mistry | |
| 2014/0282224 A1* | 9/2014 | Pedley | G06F 3/017 715/784 |
| 2014/0337791 A1 | 11/2014 | Agnetta | |
| 2015/0326575 A1 | 11/2015 | Ramirez Flores | |

OTHER PUBLICATIONS

D. Belic, "Passban Unveils Wearable Device Verification for Smartphones", Intomobile, intomobile.com, Mar. 6, 2013, pp. 1-2.

W. Uhlman, "Squeeze Clock", coroflot.com, CORE77, Inc., New York, NY, May 16, 2009; <http://www.coroflot.com/wu/Squeeze-Clock>, pp. 1-2.

D. Holman et al.; "Unifone: Designing for Auxiliary Finger Input in One Handed Mobile Interactions"; TEI '13 Proceedings of the 7th International Conference on Tangible, Embedded and Embodied Interaction; Feb. 10, 2013-Feb. 13, 2013; pp. 177-184; ISBN-13: 9781450318983; Association for Computing Machinery; New York, NY and USA.

T. Bishop, "Here Comes Sphere: Microsoft Debuts Computing in Round", Hearst Seattle Media, LLC, seattlepi.com, Jul. 28, 2008, pp. 1-3.

Cnetasia Staff, "Sony Squeezes a 'Gummi' Computer", Microsoft Corporation, zdnet.com, Jul. 1, 2003, 1 page.

T. Davies, "Nokia Kinetic Bendy Phone Is the Next Big Thing", Microsoft Corporation, conversations.nokia.com, Oct. 28, 2011, pp. 1-3.

D. Zax, "Are Bendable Smart Phones the Future?", MIT Technology Review, Nov. 1, 2011, pp. 1-3.

List of IBM Patents or Patent Applications Treated As Related—Jun. 27, 2014, pp. 1-2.

U.S. Appl. No. 14/276,382 Non-Final Office Action Mailed Aug. 12, 2016.

Roudaut et al., "Touch Input on Curved Surfaces". CHI 2011, Session: Non-Flat Displays, Vancouver, BC, Canada, May 7-12, 2011.

* cited by examiner

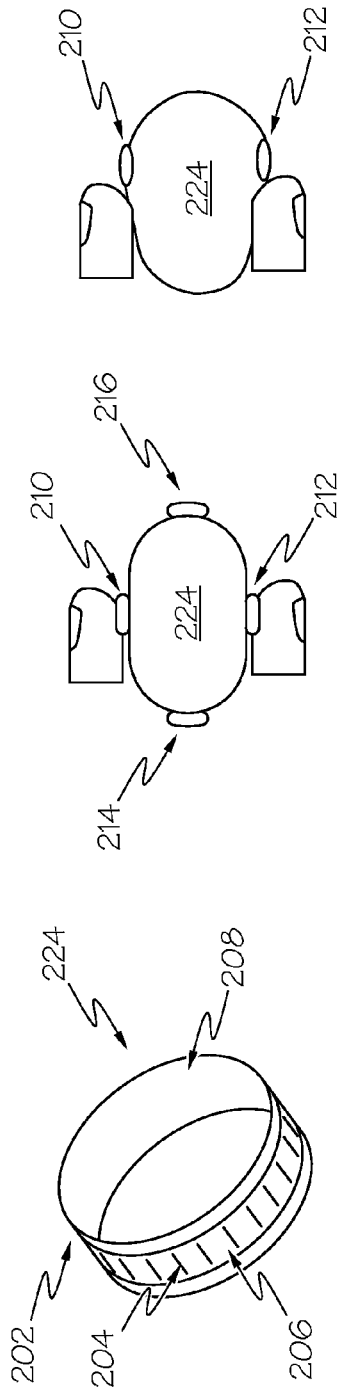
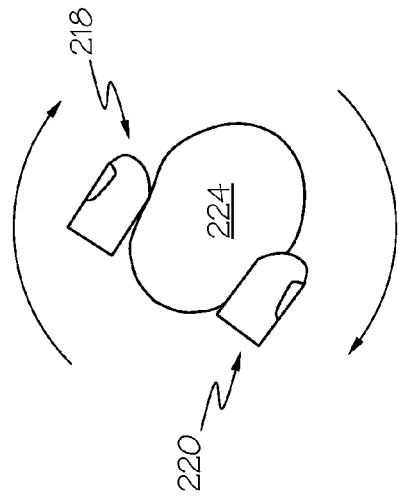

WEARABLE INPUT DEVICE

BACKGROUND

The present disclosure relates to the field of computers, and specifically to the use of input devices used with computers. Still more specifically, the present invention relates to wireless input devices.

SUMMARY

In one embodiment of the present invention, a method and/or computer program product receives inputs from a wearable input device. A communication session is established between a wearable input device and a receiving hardware device. The receiving hardware device receives an input from the wearable input device that is generated in response to a conformational change to a shape of the wearable input device, wherein the conformational change is applied to a random section of the wearable input device. The receiving hardware device thereafter initiates a responsive action that is associated with the input from the wearable input device, wherein the responsive action occurs within the receiving hardware device.

In one embodiment of the present invention, a wearable input device comprises: a shell; a set of strain gauges within the shell, wherein the set of strain gauges detects a change to a shape of the shell caused by a user pressing against one or more sides of the shell; and a wireless transceiver, wherein the wireless transceiver sends data to a receiving hardware device from the set of strain gauges to describe a conformational change to the wearable input device caused by the user manually pressing against one or more sides of the shell.

BRIEF DESCRIPTION OF THE SEVERAL VIEWS OF THE DRAWINGS

FIG. 2 illustrates an exemplary embodiment of a novel wearable input device in accordance with one or more embodiments of the present invention;

FIG. 3 depicts the novel wearable input device undergoing a change to its conformation shape due to manual manipulation by a user;

FIG. 4 illustrates the novel wearable input device being pinched in an offset manner;

FIG. 5 depicts an enlarged view of a single side of the novel wearable input device being pinched by a user;

FIG. 6 illustrates the novel wearable input device being rolled between two fingers of a user;

DETAILED DESCRIPTION

Figure 1:
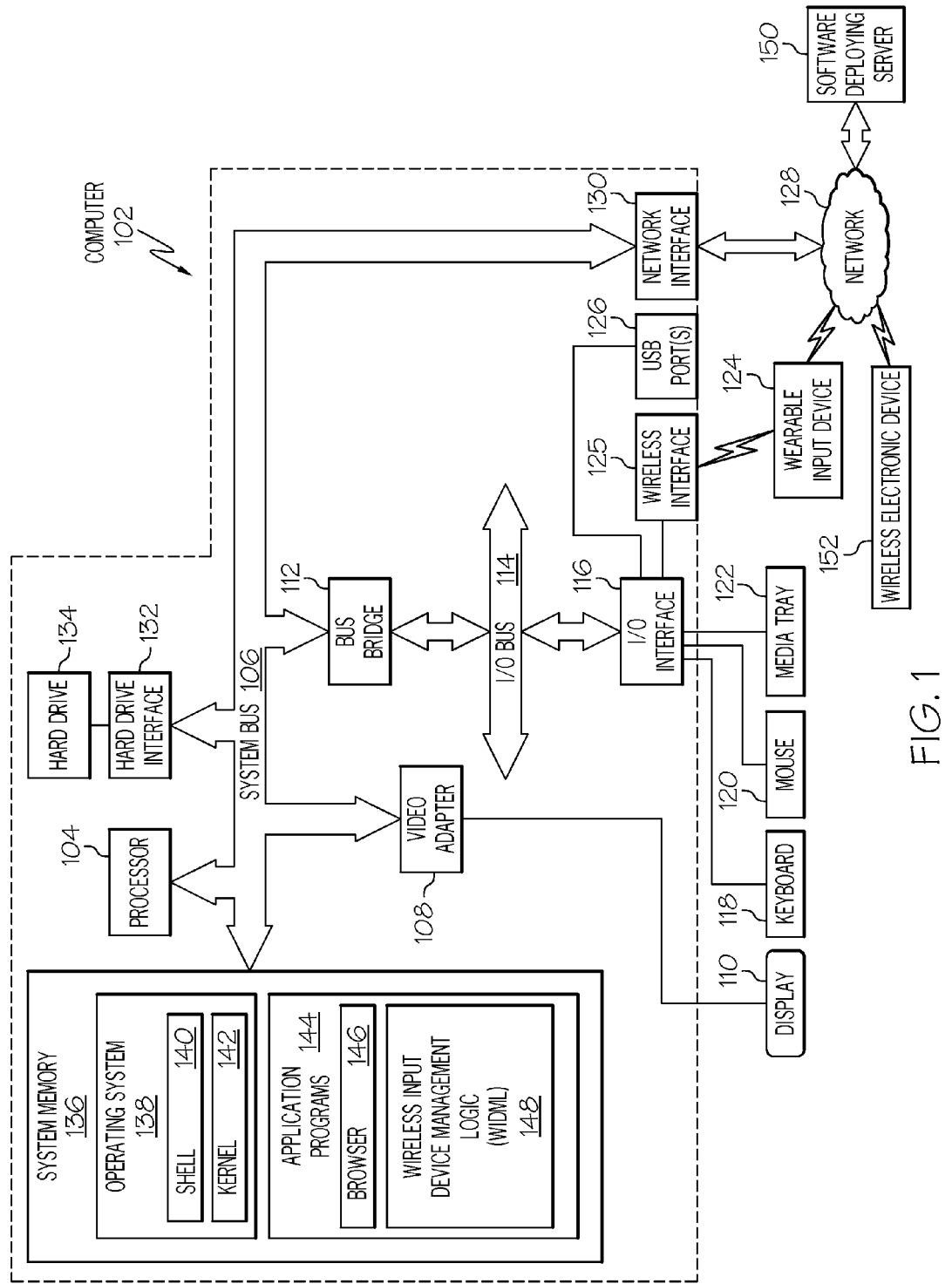
FIG. 1 depicts an exemplary system and network which may be used to implement the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a wearable input device 124 and/or a wireless electronic device 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard/mouse 118, a speaker 120, a media tray 122 (which may include storage devices such as CD-ROM drives, multi-media interfaces, etc.), a wearable input device 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

Note that in one embodiment, the wearable input device 124 communicates with computer 102 directly via a wireless interface 125, using radio frequency, infrared, or other wireless transmission carrier signals. In one embodiment, the wearable input device 124 communicates with computer 102 via the network 128, assuming that network 128 includes hardware capable of transceiving (transmitting and receiving) radio frequency, infrared, or other wireless transmission carrier signals.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a software shell 140, for providing transparent user access to resources such as application programs 144. Generally, software shell 140 is a program that provides an interpreter and an interface between the user and the operating system. More specifically, software shell 140 executes commands that are entered into a command line user interface or from a file. Thus, software shell 140, also called a command processor, is generally the highest level of the operating system software hierarchy and serves as a command interpreter. The software shell provides a system prompt, interprets commands entered by keyboard, mouse, or other user input media, and sends the interpreted command(s) to the appropriate lower levels of the operating system (e.g., a kernel 142) for processing. Note that while software shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150.

Application programs 144 in computer 102's system memory (as well as software deploying server 150's system memory) also include a wireless input device management logic (WIDML) 148. WIDML 148 includes code for implementing the processes described below, including those described in FIGS. 2-8. In one embodiment, computer 102 is able to download WIDML 148 from software deploying server 150, including in an on-demand basis, wherein the code in WIDML 148 is not downloaded until needed for execution.

The wireless electronic device 152 is any receiving device capable of receiving wireless input signals from the wearable input device 124. For example, in various embodiments of the present invention, the wireless electronic device 152 is a cell phone, a computer, an electronic switch (for various hardware entities such as appliances, cars, etc.), an actuator (e.g., to control mechanical equipment such as motors, valves, etc.), a mute button on an audio player, a servo (i.e., a controllable motor for moving a control device), etc.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

With reference now to FIG. 2, an exemplary wearable input device 224 in accordance with one or more embodiments of the present invention is presented. In one or more embodiments, the wearable input device 224 1) has the overall shape of a toroid (i.e., a "donut"), and 2) is flexible. In another embodiment, however, the wearable input device 224 is 1) ring shaped and also 2) flexible, as shown in FIG. 2. Whether a toroid or a ring, the shape of the wearable input device 224 is imparted by a shell 202, as shown in FIG. 2, which provides the outer structure (containment) of the wearable input device 224. This shell 202 is constructed of a pliable material, such as metal, plastic, composite materials (e.g., carbon fiber), etc. In one or more embodiments, this pliable material is also elastic, such that the shell 202 returns to its original shape when pressure (e.g., from a user's fingers) is removed. Note further that in one or more embodiments of the present invention, wearable input device 224 has one or more sensors 204, which are discussed in further detail with respect to FIG. 7.

Thus, wearable input device 224 may be physically manipulated (i.e., conformationally changed) by being squeezed, pinched, rolled, etc. by a user. Each conformational change (i.e., change to the shape of the wearable input device 224) results in a unique signal being emitted from the wearable input device 224 and sent to a receiving device, such as a cell phone, a computer, an actuator controller, etc., which uses the signal as an input to one or more devices.

For example, FIG. 3 shows a user pinching the wearable input device 224 between his thumb and finger, causing the wearable input device 224, which is initially circular, to take on a more oval shape. This change to wearable input device 224 to take on this more oval shape results in the wearable input device 224 generating and transmitting a specific signal to a receiving device. For example, assume that the user has squeezed opposing sides of a wearable input device (i.e., wearable input device 224), thus causing an elongation of the shape of the wearable input device into an ovoid. This results in the wearable input device generating and wirelessly transmitting an elongation signal, indicating that the wearable input device has been elongated by the user's fingers pressure. Assuming that this elongation is received by a receiving hardware device (e.g., a phone, a computer, a piece of industrial/manufacturing equipment, etc.), in an exemplary embodiment an actuator within the receiving hardware device then changes an on/off setting on a power switch within the receiving hardware device. This power switch thus turns the entire receiving hardware device off or on (assuming that a receiver and the power switch itself within the receiving hardware device are in standby/on mode), or turns a certain component within the receiving hardware device off or on, etc.

In another embodiment that utilizes the change in shape to the wearable input device 224 becoming more oval, assume that the receiving hardware device has a display screen. For example, the receiving hardware device may be a cell phone or other electronic device that has a touch-screen for receiving inputs, and/or a display for displaying content. In this embodiment, in response to the receiving hardware device receiving the elongation signal (described above), hardware logic (e.g., one or more processors) within the receiving hardware device will lock or unlock the display screen on the receiving hardware device.

In another embodiment that utilizes the change in shape to the wearable input device 224 becoming more oval, note that which sides of the wearable input device 224 are squeezed determines the type of signal that is generated. For example, assume that the wearable input device 224 has opposing top/bottom sides and opposing left/right sides. That is, assume that marker 210 and/or marker 212 respectively indicate a top and bottom of wearable input device 224. Similarly, marker 214 and/or marker 216 respectively indicate a left and right side of wearable input device 224. Thus, if the user squeezed against marker 210 and marker 212, then a first signal is generated, while squeezing against marker 214 and marker 216 generates a second signal. These first and second signals cause different actions in the receiving electronic device. For example, the first signal may turn the electronic device on, while the second signal may turn the electronic device off.

In one embodiment of the present invention, the wearable input device 224 is squeezed by the user's fingers offset from center, thus causing a bulging of the wearable input device 224. That is, the conformational change to the shape of the wearable input device is caused by a user squeezing opposing sides of the wearable input device offset from center in order to cause a simultaneous narrowing of a first section and widening of a second section of the wearable input device. For example, consider FIG. 4, which shows a user pinching the wearable input device 224 not at opposite centerpoints, but rather offset to these centerpoints. That is, assume that wearable input device 224 is initially a circle, and markers 210 and 212 (also shown in FIG. 3) are diametrically opposed (i.e., are 180 degrees apart; are "antipodes"). When markers 210 and 212 are squeezed towards each other as depicted in FIG. 3, an oval shape to the wearable input device 224 results. However, if the user squeezes the wearable input device 224 at positions that are offset to positions indicated markers 210 and 212 (regardless of whether markers 210 and/or 212 actually appear on the wearable input device 224), then the wearable input device 224 bulges out to one side, as depicted in FIG. 4. In this embodiment, the wearable input device 224 will generate and transmit an offset pinching signal to the receiving hardware device. This offset pinching signal from the wearable input device indicates the simultaneous narrowing of the first section and widening of the second section of the wearable input device, as depicted in FIG. 4.

Assume now that the receiving hardware device has a display that is showing a video. For example, the receiving hardware device may be a tablet computer, a smart phone, etc., which is able to show a video clip. In one embodiment, upon receipt of a first offset pinching signal, the receiving hardware device will cause this video to fast forward. That is, assume that the fast forward of the video is caused by a signal (i.e., the first offset pinching signal) that is generated when the wearable input device 224 is squeezed such that it bulges to the right (as shown in FIG. 4). However, if the wearable input device 224 is squeezed such that it bulges to the left (not shown), then the receiving hardware device receives a different second offset pinching signal (indicating the different direction of the squeezing action), thus resulting in the video being played backwards (i.e., being shown playing in reverse and/or simply being rewound). That is, if the user squeezes the wearable input device to the right of positions on the wearable input device 224 marked by markers 210 and 212, then the wearable input device 224 will bulge to the left (not shown), resulting in the wearable input device 224 generating and transmitting a second offset pinching signal, which causes the video to rewind/play backwards on the receiving hardware device.

In one embodiment of the present invention, the wearable input device 224 is squeezed by the user's fingers deforming not the entire wearable input device 224, but rather just a portion of the wearable input device 224. That is, in one embodiment, rather than squeezing opposing sides of the wearable input device 224 together, a portion of a single side is squeezed together. For example, consider FIG. 5, which shows a section of the wearable input device 224 having two surfaces, an outer surface 206 and an inner surface 208 (as also shown in FIG. 1). Thus, as shown in FIG. 5, the conformational change to the shape of the wearable input device 224 is caused by a user pinching the outer surface 206 and the inner surface 208 of a single side of the wearable input device. In this embodiment, assume that pinching the shell of the wearable input device 224 (i.e., pressing the outer surface 206 and the inner surface 208 towards each other as shown in FIG. 5) causes the wearable input device 224 to generate and transmit, to a receiving hardware device (e.g., a computer, a smart phone, an smart watch, etc.), a pinching signal. This pinching signal indicates that the user is pinching an outer surface and an inner surface of a single side of the wearable input device.

In one embodiment of the present invention, assume that the receiving hardware device includes a hardware counter device. In various embodiments, this hardware counter device is a manual counter (i.e., a "clicker" that is clicked by the user to increase a manual count of persons, cars, parts, etc.). Thus, in response to the receiving hardware device receiving the pinching signal, the hardware counter device within the receiving hardware device is increased. For example, assume that the user is counting how many cars pass through an intersection in a five minute interval. Each time the user pinches together the inner and outer surfaces of the wearable input device 224 (as shown in FIG. 5), the count on this manual counter is increased by one. Similarly, pinching another section of the wearable input device 224 may decrease the count by one.

In one embodiment of the present invention, assume that the receiving hardware device is a computer that is running a particular software program. In this embodiment, the pinching signal (caused by the user pinching together the inner and outer surfaces of the wearable input device— wearable input device 224) causes that particular software program to pause, close, or otherwise change its mode of operation when the computer receives the pinching signal.

In one embodiment of the present invention, the shape of the wearable input device 224 is changed by a rolling motion between the user's fingers. For example, consider now FIG. 6, which shows an embodiment in which the conformational change to the shape of the wearable input device is a rotation movement caused by a user rotating the wearable input device by a lateral squeezing force by the user against opposing sides of the wearable input device, such that the lateral squeezing force elongates the shape of the wearable input device, and where the lateral squeezing force causes the wearable input device to roll across a user's fingers in a rolling movement. That is, the user slightly squeezes the edges of the wearable input device 224, and then moves his finger 218 in one direction while moving his thumb 220 in the opposite direction, causing the (slightly deformed) wearable input device 224 to rotate.

Thus, in one embodiment, assume that the receiving hardware device (e.g., a computer, a smart phone, an annunciator panel, etc.) includes an audio component that produces audio content through a speaker (e.g., speaker 120 shown in FIG. 1). In response to receiving a rolling signal indicating the rolling movement of the wearable input device, the receiving hardware device adjusts a volume of the audio content in accordance with the rolling signal. That is, squeezing and rolling the wearable input device 224 emulates turning a volume knob up or down, which results in the rolling signal for adjusting the volume accordingly.

In another embodiment in which a rolling signal is used, assume that the receiving hardware device has a display (e.g., display 110 shown in FIG. 1), on which video content (fixed or dynamic) is displayed through the use of a video hardware component (e.g., video adapter 108 shown in FIG. 1). Assume further that the video content can be displayed at an adjustable lighting level, such that a user can turn the lighting level up when outside (for better visibility) or down when inside (to avoid looking into an excessively bright screen). In this embodiment, the rolling signal (generated by the user rotating the wearable input device while squeezing the wearable input device, and sent to the receiving hardware device) causes the lighting level to be turned brighter or dimmer, according to the rolling movement of the wearable input device 224 imparted by the user. That is, the receiving hardware device receives a rolling signal indicating the rolling movement of the wearable input device and, in response to the receiving hardware device receiving the rolling movement, the video hardware component within the receiving hardware device adjusts the lighting level of the video content being displayed.

In another embodiment in which a rolling signal is used, assume that the receiving hardware device is an electronic device (e.g., a tablet computer, a smart phone, an electronic billboard, etc.) that displays (e.g., on display 110 shown in FIG. 1) a video content, such as a text document, a webpage, messages, etc. In this embodiment, the rolling signal causes the display to scroll up or down. That is, as the user rolls the wearable input device 224 in a manner such as that shown in FIG. 6, the displayed information is scrolled up or down. Thus, when the receiving hardware device receives a rolling signal indicating the rolling movement of the wearable input device, the receiving hardware devices causes the content being displayed on the video display to scroll up and down in a corresponding manner.

In another embodiment in which a rolling signal is used, assume that the receiving hardware device includes a motor for moving a latch assembly in a door. That is, assume that a servo/motor is attached to a spindle that, when rotated, causes a latch assembly within a door to open/close, thus causing the door to be "open" (such that the latch is away from the strike plate on the door frame) or "closed" (such that the latch is within the strike plate). In this embodiment, when the receiving hardware device receives a rolling signal indicative of the rolling movement of the wearable input device, the servo/motor is actuated to move the latch assembly, thus opening or closing the door. Thus, rolling the wearable input device 224 in a manner such as that depicted in FIG. 6 emulates the motion of turning a door knob, which results in a door associated with the receiving hardware device opening and closing in an analogous manner.

Figure 7:
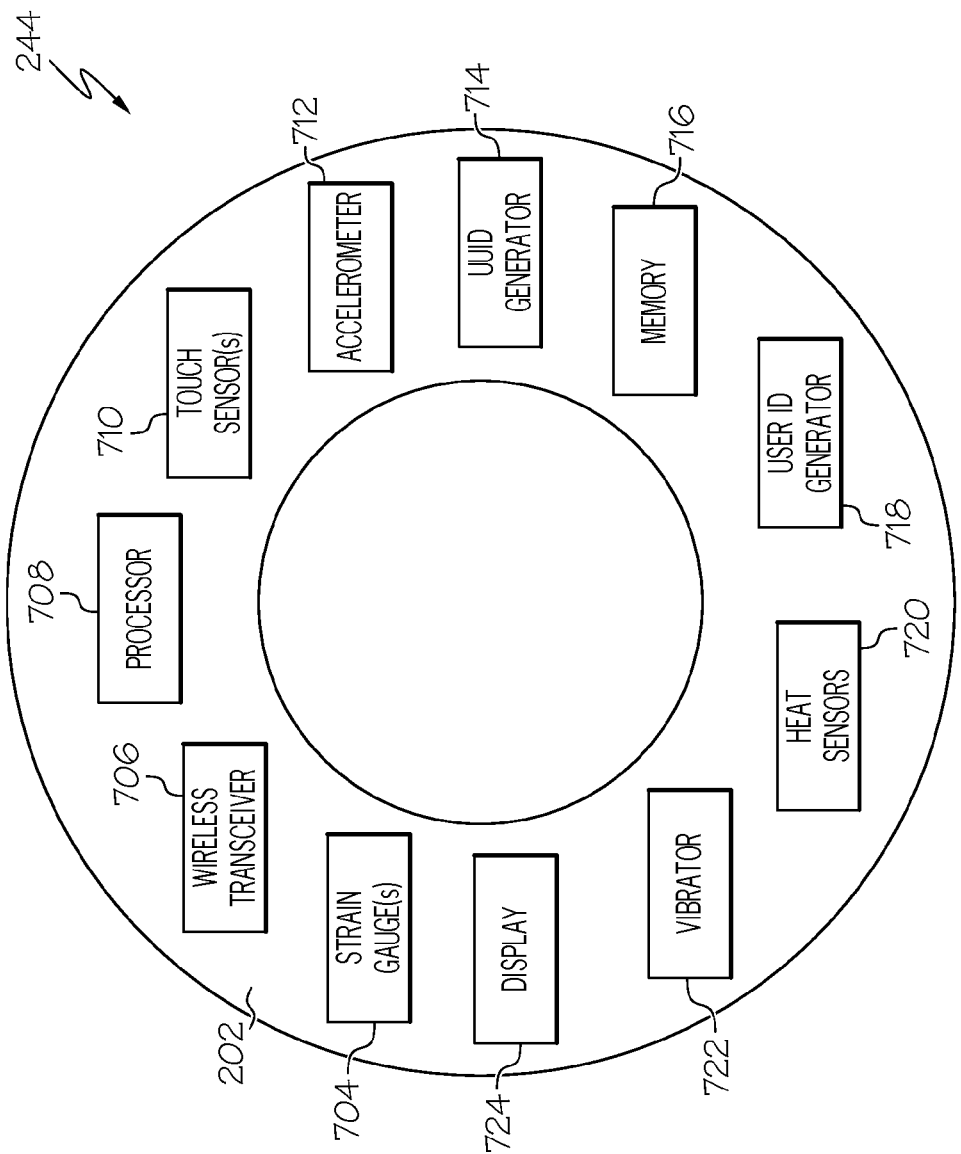
FIG. 7 depicts additional details of exemplary components within the novel wearable input device.

With reference now to FIG. 7, additional detail of an exemplary embodiment of the novel wearable input device 224 in accordance with one or more embodiments of the present invention is presented. As described above in FIG. 2, the wearable input device 224 includes a shell 202, which gives the wearable input device 224 its shape and physical support.

Within the shell 202 are multiple electronic components, including one or more of the components depicted in FIG. 1 for computer 102. As depicted in FIG. 7, specific components (beyond those found in computer 102) include one or more of the following components: one or more strain gauge(s) 704, a wireless transceiver 706, a processor 708, one or more touch sensor(s) 710, one or more accelerometer(s) 712, a universally unique identifier (UUID) generator 714, a memory 716, a user identifier generator 718, one or more heat sensors 720, a vibrator 722, and/or a display 724.

Strain gauge(s) 704 are a set of strain gauges specifically constructed and positioned through the wearable input device 224 (i.e., within the shell 202) to detect compression deformation of the shell (e.g., a user pinching the wearable input device 224 to cause it to change shape). Strain gauge(s) 704 can utilize either mechanical (e.g., springs, etc.) or electronic devices (e.g., piezoelectric, piezoresistive and capacitive components) to measure the amount of pinching and/or deflection and/or rotational torquing etc. caused by a user's fingers when manipulating the shell 202. That is, the shell 202 is capable of being elastically pressed, rolled, pinched, etc., as described above in FIG. 3-FIG. 6. For example, a user can squeeze the shell 202, causing it to become more elongated while being squeezed/pinched. The shell 202 then returns to its original shape when no longer being squeezed/pinched. This elasticity is due to the physical composition of the materials used to construct the shell 202.

The wireless transceiver 706 is capable of sending and receiving data between a hardware receiving device (e.g., computer 102 shown in FIG. 1) and the strain gauge(s) 704, touch sensor(s) 710, an accelerometer 712, a UUID generator 714, a user identification (ID) generator 718, and/or heat sensors 720. For example, assume that a set of strain gauges (strain gauge(s) 704) within the shell detects a change to a shape of the shell caused by a user pressing against one or more sides of the shell. The wireless transceiver 706 is thus able to send to a receiving hardware device readings from the set of strain gauges that describe a conformational change to the wearable input device caused by the user manually pressing against one or more sides of the shell.

A processor 708 is used in one or more embodiments to process signals received from local sensors (e.g., strain gauge(s) 704, touch sensor(s) 710, accelerometer 712, heat sensors 720), thus interpreting the manipulation of the wearable input device 224.

The touch sensor(s) 710 are a set of touch sensors that detect a position and level of pressure exerted by a user's fingers against edges of the shell 202. That is, when the user holds the wearable input device 224 in his/her hands, his/her fingers press against the edges of the shell 202. The pressures imparted, indicating both where the fingers are positioned against the shell 202 and the amount of pressure they are exerting, are detected by the touch sensor(s) 710. These touch sensor(s) 710 may include deflection sensors (e.g., piezoelectric crystals) and/or other devices that are capable of converting mechanical pressure into an electric signal.

In one embodiment, the touch sensor(s) 710 are a set of sequential touch sensors within the shell 202. That is, the set of sequential touch sensors are placed in an array, such that sequential pressure points against the shell 202 can be detected. That is, consider again the rolling motion of the wearable input device 224 shown in FIG. 6. As the wearable input device 224 rolls against the pinched finger/thumb of the user, different points of contact are made with the outer surface of the shell 202. This rolling motion is detected by a sequential set of readings from the touch sensor(s) 710. That is, a first touch sensor initially detects the finger against the outer surface of the shell 202. A second touch sensor is next to the first touch sensor. As the wearable input device 224 rotates (rolls against the user's finger), the second touch sensor is then activated while the first touch sensor is deactivated. A third touch sensor then detects a third place on the shell 202 that the user's finger is touching, etc., such that a rolling set of readings indicates the rolling motion of the wearable input device 224 between the user's thumb and finger. In one embodiment, the local processor 708 interprets these readings from the set of sequential touch sensors as being the result of a rolling motion of the user's finger's against the shell. A signal describing this rolling motion can then be sent to the receiving hardware device, rather than requiring the receiving hardware device to interpret the readings from the touch sensor(s) 710.

Accelerometer 712 detects lateral and rotational movement of the shell. While mechanical in one embodiment (i.e., using springs, etc.), in other embodiments the accelerometer 712 employs the use of electronic devices (e.g., piezoelectric, piezoresistive and capacitive components) to measure the magnitude and direction of movement of the wearable input device 224 (in one, two or three physical Cartesian dimensions, as well as the fourth time dimension). In one embodiment, the accelerometer 712 within the shell sends its readings to the local processor 708, which takes readings from the accelerometer to detect lateral and rotational movement of the shell 202. In one embodiment, the processor 708 then generates a signal describing such lateral and rotational movement of the shell 202, and sends this signal to the receiving hardware device. In another embodiment, the receiving hardware device interprets the raw readings from the accelerometer 712 to discern the lateral and rotational movement of the shell 202.

The universally unique identifier (UUID) generator 714 generates a UUID that identifies a particular input device, such as wearable input device 224. In one embodiment and as suggested by its name, the UUID generator 714 generates the UUID by taking real-time readings from the touch sensor(s) 710 and/or strain gauge(s) 704, as well as manufacturer data from a memory 716 (e.g., a register, cache, static memory, etc.) within the shell 202 as inputs to generate a dynamic UUID. That is, the dynamic UUID changes according to how the wearable input device 224 is being physically manipulated. In another embodiment, the UUID is just a UUID created by the manufacturer of the wearable input device 224, and which is stored within the memory 716. Thus, in this other embodiment, the UUID generator 714 merely retrieves the UUID data from memory 716. In either embodiment, the UUID created by the UUID generator 714 can be used to authenticate a particular wearable input device 224 as being authorized to send input signals to a particular receiving hardware device.

The user identifier (ID) generator 718 generates an identity of the user who is 1) authorized to use the wearable input device 224, and/or 2) is currently handling the wearable input device 224. In a manner similar to that just described for the UUID generator 714, in one embodiment the user ID generator 718 generates the user ID by taking real-time readings from the touch sensor(s) 710 and/or strain gauge(s) 704, as well as user-input data from memory 716 as inputs to generate a dynamic user ID. This dynamic user ID changes according to how the wearable input device 224 is being physically manipulated. In another embodiment, the user ID is just a user identity (e.g., name, etc.) that has been input by the user and/or an authorizing entity into the memory 716. In this other embodiment, user ID generator 718 merely retrieves the user ID data from memory 716. In either embodiment, the user ID created by the user ID generator 718 can be used to authenticate a user of a particular wearable input device 224 as being authorized to send input signals to a particular receiving hardware device.

Heat sensors 720 are an array of heat sensors distributed through a surface of the shell 202 of the wearable input device 224. These heat sensors 720 are able to detect heat from a user's fingers/thumb, thus providing information regarding when the user is touching the shell 202.

As stated above, the wearable input device 224 includes a wireless transceiver 706. As discussed above, this wireless transceiver 706 is able to transmit signals away from the wearable input device 224. However, as the name suggests, the wireless transceiver 706 is also able to receive signals at the wearable input device 224. For example, assume that the wearable input device 224 has sent a signal to a receiving hardware device (e.g., a computer) instructing the computer to turn off. The wireless transceiver 706 can then receive a response signal from the computer, indicating that the computer has turned off. If the wearable input device 224 has a vibrator 722, then vibrator 722 will vibrate to let the user know that the computer has been turned off. If the wearable input device 224 has a display 724, then display 724 will produce a visual indication (e.g., a simple color-coded light-emitting-diode (LED) being turned on up to a screen display showing a text message) to let the user know that the computer has been turned off.

Figure 8:
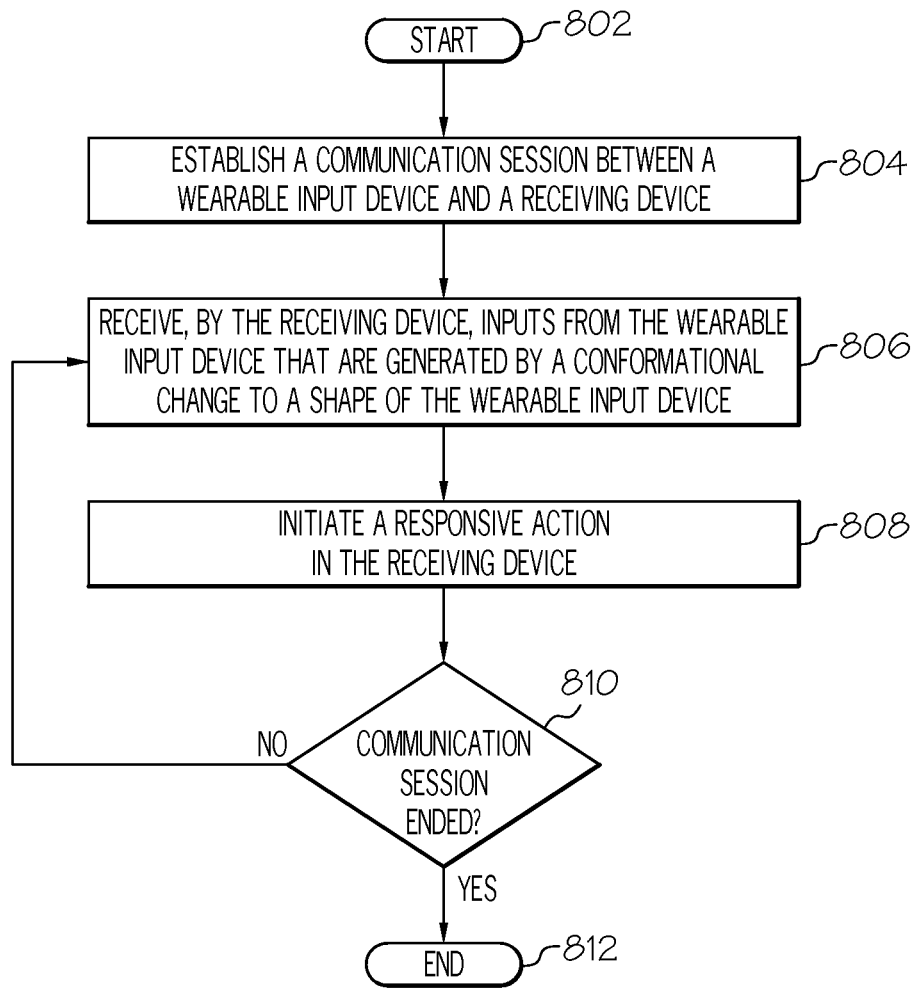
FIG. 8 is a high level flow chart of one or more exemplary steps taken by one or more processors to receive inputs from a wearable input device.

With reference now to FIG. 8, a high level flow chart of one or more exemplary steps taken by one or more processors to receive inputs from a wearable input device is presented. After initiator block 802, one or more processors establish a communication session between a wearable input device (e.g., the wearable input device 224 shown in FIG. 2) and a receiving hardware device (e.g., computer 102 and/or wireless electronic device 152 shown in FIG. 1), as described in block 804.

As described in block 806, the receiving hardware device then receives an input from the wearable input device that is generated in response to a conformational change to a shape of the wearable input device. Note that in one embodiment, this conformational change is applied to a random section of the wearable input device. That is, the conformational change is not merely pushing a button, rolling a wheel, or otherwise manipulating a component that is affixed to the wearable input device at a specific place on the wearable input device.

As described in block 808, the receiving hardware device then initiates a responsive action that is associated with the input from the wearable input device, where the responsive action occurs within the receiving hardware device. Examples of such responsive actions include, but are not limited to, turning the receiving hardware device off or on, turning a volume control on the receiving hardware device up or down, fast forwarding video content being displayed on the receiving hardware device, etc.

A query is made in query block 810 to determine if the communication session between the wearable input device and the receiving hardware device has ended. This communication session can be ended by the user of the wearable input device physically manipulating (e.g., pinching, rotating, etc.) the wearable input device, thus causing a session termination signal to be sent to the receiving hardware device. Other means for ending the communication session include turning the receiving hardware device off, moving the wearable input device to a location that is too distant for the receiving hardware device to receive signals (e.g., in a near field communication system), etc. If so, then the process ends at terminator block 812.

In one embodiment of the present invention, one or more processors authenticates a particular wearable input device as being authorized to provide inputs to a receiving hardware device by matching a user identifier within the wearable input device with an authorized user name, where the user identifier identifies a user of the wearable input device (see element 718 in FIG. 7).

In one embodiment of the present invention, one or more processors authenticates a particular wearable input device as being authorized to provide inputs to a receiving hardware device by matching a universally unique identifier (UUID) within the wearable input device with an authorized input device name (e.g., where the authorized input device name is stored in a memory within the receiving hardware device). As described above, this UUID identifies a particular input device.

In one embodiment of the present invention, the conformational change to the shape of the wearable input device is caused by a user splaying the user's fingers within the wearable input device in order to expand the wearable input device. For example, consider the wearable input device 224 shown in FIG. 2. Assume that, rather than squeezing the outside of the shell 202, the user places his fingers within the wearable input device 224, causing the shell 202 to expand. Assume further, in this embodiment, that the receiving hardware device (e.g., computer 102 shown in FIG. 1) includes a display (e.g., display 110 shown in FIG. 1). In this embodiment, then, the receiving hardware device receives an expansion signal from the wearable input device indicating an expansion of the wearable input device caused by the user splaying the user's fingers within the wearable input device. Thereafter, in response to receiving the expansion signal, the receiving hardware device enlarges an image on the display on the receiving hardware device. That is, if the user splays his fingers outward, and thus presses against the inner surface of the shell 202, this is suggestive of the user wanting to enlarge an image, and the computer acts accordingly. Similarly, if the user places his fingers such that they surround the shell 202 evenly, then squeezing the shell 202 indicates that the user wants to make the image smaller, and the computer acts accordingly. The position and pressure exerted by the user's fingers are detected by any combination of the strain gauge(s) 704, touch sensor(s) 710, and heat sensors 720 shown in FIG. 7.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described embodiments of the invention of the present application in detail and by reference to illustrative embodiments thereof, it will be apparent that modifications and variations are possible without departing from the scope of the invention defined in the appended claims.

What is claimed is:

1. A method of receiving inputs from a wearable input device, the method comprising:

establishing, by one or more processors, a communication session between a wearable input device and a receiving hardware device;

receiving, by the receiving hardware device, an elongation signal from the wearable input device indicating a conformational change to a shape of a random section of the wearable input device that is caused by a user squeezing opposing sides of the wearable input device;

in response to the receiving hardware device receiving the elongation signal, an actuator changing an on/off setting on a power switch within the receiving hardware device and one or more processors within the receiving hardware device unlocking a display screen on the receiving hardware device;

receiving, by the receiving hardware device, a first offset pinching signal from the wearable input device, wherein the first offset pinching signal indicates a conformational change to the shape of the wearable input device that is caused by the user squeezing opposing sides of the wearable input device offset from center in order to cause a simultaneous narrowing of a first section and widening of a second section of the wearable input device;

in response to the receiving hardware device receiving the first offset pinching signal, one or more processors within the receiving hardware device causing a video being displayed on the display screen on the receiving hardware device to fast forward;

receiving, by the receiving hardware device, a second offset pinching signal from the wearable input device, wherein the second offset pinching signal indicates a conformational change to the shape of the wearable input device that is caused by the user squeezing opposing sides of the wearable input device offset from center in order to cause a simultaneous narrowing of a third section and widening of a fourth section of the wearable input device;

in response to the receiving hardware device receiving the second offset pinching signal, one or more processors within the receiving hardware device causing the video to play backwards on the display screen;

receiving, by the receiving hardware device, an expansion signal from the wearable input device caused by a user's fingers, wherein the expansion signal indicates an expansion of the wearable input device caused by the user splaying the user's fingers within the wearable input device;

in response to the receiving hardware device receiving the expansion signal, enlarging an image on the display screen on the receiving hardware device;

receiving, by the receiving hardware device, a pinching signal from the wearable input device indicating the user pinching an outer surface and an inner surface of a single side of the wearable input device;

in response to the receiving hardware device receiving the pinching signal, increasing a count in a hardware counter device in the receiving hardware device;

in response to the computer receiving the pinching signal, pausing a particular program that is running on the receiving hardware device;

receiving, by the receiving hardware device, a rolling signal indicating a rolling movement of the wearable input device, wherein the rolling movement is a rotation movement caused by the user rotating the wearable input device by a lateral squeezing force by the user against opposing sides of the wearable input device, wherein the lateral squeezing force elongates the shape of the wearable input device, wherein the lateral squeezing force causes the wearable input device to roll across a user's fingers in a rolling movement;

in response to the receiving hardware device receiving the rolling movement, adjusting a volume level for a speaker on the receiving hardware device, a lighting level of video content being displayed on the display screen on the receiving hardware device, and a scrolling motion of content being displayed on the display screen;

in response to the receiving hardware device receiving the rolling movement, actuating a servo/motor for moving a latch assembly in a door, wherein the servo/motor is attached to a spindle that, when rotated, causes the latch assembly within the door to open/close by the servo/motor being actuated to move the latch assembly, thus opening or closing the door;

authenticating, by one or more processors, the wearable input device as being authorized to provide inputs to a receiving hardware device by matching a user identifier within the wearable input device with an authorized user name, wherein the user identifier identifies a user of the wearable input device; and authenticating, by one or more processors, the wearable input device as being authorized to provide inputs to a receiving hardware device by matching a universally unique identifier (UUID) within the wearable input device with an authorized input device name, wherein the UUID identifies a particular input device.

2. A computer program product for receiving inputs from a wearable input device, the computer program product comprising a non-transitory computer readable storage medium having program code embodied therewith, the program code readable and executable by a processor to perform a method comprising:

establishing a communication session between the wearable input device and a receiving hardware device;

receiving, by the receiving hardware device, an elongation signal from the wearable input device indicating a conformational change to a shape of a random section of the wearable input device that is caused by a user squeezing opposing sides of the wearable input device;

in response to the receiving hardware device receiving the elongation signal, causing an actuator to change an on/off setting on a power switch within a receiving hardware device and the receiving hardware device to unlock a display screen on the receiving hardware device;

receiving, by the receiving hardware device, a first offset pinching signal from the wearable input device, wherein the first offset pinching signal indicates a conformational change to the shape of the wearable input device that is caused by the user squeezing opposing sides of the wearable input device offset from center in order to cause a simultaneous narrowing of a first section and widening of a second section of the wearable input device;

in response to the receiving hardware device receiving the first offset pinching signal, the receiving hardware device causing a video being displayed on the display screen on the receiving hardware device to fast forward;

receiving, by the receiving hardware device, a second offset pinching signal from the wearable input device, wherein the second offset pinching signal indicates a conformational change to the shape of the wearable input device that is caused by the user squeezing opposing sides of the wearable input device offset from center in order to cause a simultaneous narrowing of a third section and widening of a fourth section of the wearable input device;

in response to the receiving hardware device receiving the second offset pinching signal, receiving hardware device causing the video to play backwards on the display screen;

receiving, by the receiving hardware device, an expansion signal from the wearable input device caused by a user's fingers, wherein the expansion signal indicates an expansion of the wearable input device caused by the user splaying the user's fingers within the wearable input device;

in response to the receiving hardware device receiving the expansion signal, enlarging an image on the display screen on the receiving hardware device;

receiving, by the receiving hardware device, a pinching signal from the wearable input device indicating the user pinching an outer surface and an inner surface of a single side of the wearable input device;

in response to the receiving hardware device receiving the pinching signal, increasing a count in a hardware counter device in the receiving hardware device;

in response to the computer receiving the pinching signal, pausing a particular program that is running on the receiving hardware device;

receiving, by the receiving hardware device, a rolling signal indicating a rolling movement of the wearable input device, wherein the rolling movement is a rotation movement caused by the user rotating the wearable input device by a lateral squeezing force by the user against opposing sides of the wearable input device, wherein the lateral squeezing force elongates the shape of the wearable input device, wherein the lateral squeezing force causes the wearable input device to roll across a user's fingers in a rolling movement;

in response to the receiving hardware device receiving the rolling movement, adjusting a volume level for a speaker on the receiving hardware device, a lighting level of video content being displayed on the display screen on the receiving hardware device, and a scrolling motion of content being displayed on the display screen;

in response to the receiving hardware device receiving the rolling movement, actuating a servo/motor for moving a latch assembly in a door, wherein the servo/motor is attached to a spindle that, when rotated, causes the latch assembly within the door to open/close by the servo/motor being actuated to move the latch assembly, thus opening or closing the door;

authenticating the wearable input device as being authorized to provide inputs to a receiving hardware device by matching a user identifier within the wearable input device with an authorized user name, wherein the user identifier identifies a user of the wearable input device; and authenticating the wearable input device as being authorized to provide inputs to a receiving hardware device by matching a universally unique identifier (UUID) within the wearable input device with an authorized input device name, wherein the UUID identifies a particular input device.

3. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to establish a communication session between the wearable input device and a receiving hardware device;

program instructions to receive, by the receiving hardware device, an elongation signal from the wearable input device indicating a conformational change to a shape of a random section of the wearable input device that is caused by a user squeezing opposing sides of the wearable input device;

program instructions to, in response to the receiving hardware device receiving the elongation signal, cause an actuator to change an on/off setting on a power switch within a receiving hardware device and the receiving hardware device to unlock a display screen on the receiving hardware device;

program instructions to receive, by the receiving hardware device, a first offset pinching signal from the wearable input device, wherein the first offset pinching signal indicates a conformational change to the shape of the wearable input device that is caused by the user squeezing opposing sides of the wearable input device offset from center in order to cause a simultaneous narrowing of a first section and widening of a second section of the wearable input device;

program instructions to, in response to the receiving hardware device receiving the first offset pinching signal, cause a video being displayed on the display screen on the receiving hardware device to fast forward;

program instructions to receive, by the receiving hardware device, a second offset pinching signal from the wearable input device, wherein the second offset pinching signal indicates a conformational change to the shape of the wearable input device that is caused by the user squeezing opposing sides of the wearable input device offset from center in order to cause a simultaneous narrowing of a third section and widening of a fourth section of the wearable input device;

program instructions to, in response to the receiving hardware device receiving the second offset pinching signal, cause the video to play backwards on the display screen;

program instructions to receive, by the receiving hardware device, an expansion signal from the wearable input device caused by a user's fingers, wherein the expansion signal indicates an expansion of the wearable input device caused by the user splaying the user's fingers within the wearable input device;

program instructions to, in response to the receiving hardware device receiving the expansion signal, enlarge an image on the display screen on the receiving hardware device;

program instructions to receive, by the receiving hardware device, a pinching signal from the wearable input device indicating the user pinching an outer surface and an inner surface of a single side of the wearable input device;

program instructions to, in response to the receiving hardware device receiving the pinching signal, increase a count in a hardware counter device in the receiving hardware device;

program instructions to, in response to the computer receiving the pinching signal, pause a particular program that is running on the receiving hardware device;

program instructions to receive, by the receiving hardware device, a rolling signal indicating a rolling movement of the wearable input device, wherein the rolling movement is a rotation movement caused by the user rotating the wearable input device by a lateral squeezing force by the user against opposing sides of the wearable input device, wherein the lateral squeezing force elongates the shape of the wearable input device, wherein the lateral squeezing force causes the wearable input device to roll across a user's fingers in a rolling movement;

program instructions to, in response to the receiving hardware device receiving the rolling movement, adjust a volume level for a speaker on the receiving hardware device, a lighting level of video content being displayed on the display screen on the receiving hardware device, and a scrolling motion of content being displayed on the display screen;

program instructions to, in response to the receiving hardware device receiving the rolling movement, actuate a servo/motor for moving a latch assembly in a door, wherein the servo/motor is attached to a spindle that, when rotated, causes the latch assembly within the door to open/close by the servo/motor being actuated to move the latch assembly, thus opening or closing the door;

program instructions to authenticate the wearable input device as being authorized to provide inputs to a receiving hardware device by matching a user identifier within the wearable input device with an authorized user name, wherein the user identifier identifies a user of the wearable input device; and program instructions to authenticate the wearable input device as being authorized to provide inputs to a receiving hardware device by matching a universally unique identifier (UUID) within the wearable input device with an authorized input device name, wherein the UUID identifies a particular input device.

* * * * *